(12) United States Patent
Menkhoff et al.

(10) Patent No.: US 7,133,470 B2
(45) Date of Patent: Nov. 7, 2006

(54) RECEIVER WITH OFFSET COMPENSATION

(75) Inventors: Andreas Menkhoff, Oberhaching (DE); Matthias Schoebinger, Munich (DE)

(73) Assignee: Infineon Technologies AG, Munich (DE)

( * ) Notice: Subject to any disclaimer, the term of this patent is extended or adjusted under 35 U.S.C. 154(b) by 812 days.

(21) Appl. No.: 10/301,235

(22) Filed: Nov. 21, 2002

(65) Prior Publication Data
US 2003/0118120 A1    Jun. 26, 2003

(30) Foreign Application Priority Data
Nov. 23, 2001 (DE) ............................. 101 57 392

(51) Int. Cl.
H04L 27/14 (2006.01)
H04L 27/16 (2006.01)
H04L 27/22 (2006.01)
(52) U.S. Cl. .................. 375/326; 375/327; 375/376
(58) Field of Classification Search ............ 375/326, 375/261, 327, 344, 375, 376, 373; 455/257, 455/260, 265
See application file for complete search history.

(56) References Cited

U.S. PATENT DOCUMENTS 5,644,606 A * 7/1997 Martinez et al. ............ 375/376
5,809,096 A * 9/1998 Martinez et al. ............ 375/375
6,490,010 B1 * 12/2002 Shibuya et al. ............. 348/735

FOREIGN PATENT DOCUMENTS

EP             0 828 366 A2       3/1998

OTHER PUBLICATIONS

Mirabbasi et al., "Classical and Modern Receiver Architectures," Topics in Circuits for Communications, IEEE COmmunications Magazine (USA), p. 132-139, (Nov. 2000).

* cited by examiner

Primary Examiner—Phuong Phu
(74) Attorney, Agent, or Firm—Jenkins, Wilson, Taylor & Hunt, P.A.

(57) ABSTRACT

Receiver for receiving a received signal with a carrier frequency loop (18) which generates a carrier frequency deviation detection signal (TF) for detecting a carrier frequency of the received signal in a first carrier frequency capture range; a carrier phase loop (32) which generates a carrier phase deviation detection signal (TP) for detecting a carrier phase of the received signal, and settles when the carrier frequency deviation detection signal (TF) is within a second carrier frequency capture range; and with an offset control circuit (29) which changes the carrier frequency deviation detection signal (TF) and/or changes the second carrier frequency capture range by means of an offset control signal until a carrier phase lock detection circuit (21) indicates to the offset control circuit that the carrier phase offset of the received signal is less than an adjustable threshold value.

9 Claims, 7 Drawing Sheets

FIG 3
Prior art
FIG 3A
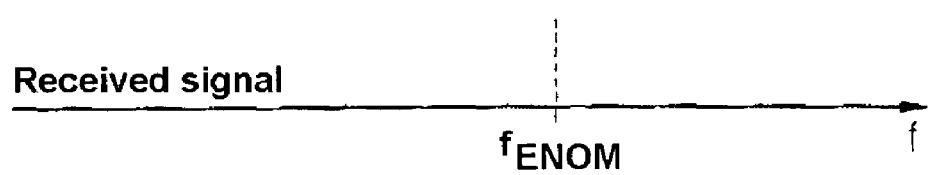
Received signal
FIG 3B
TF ideal
Carrier frequency deviation
detection signal
FIG 3C
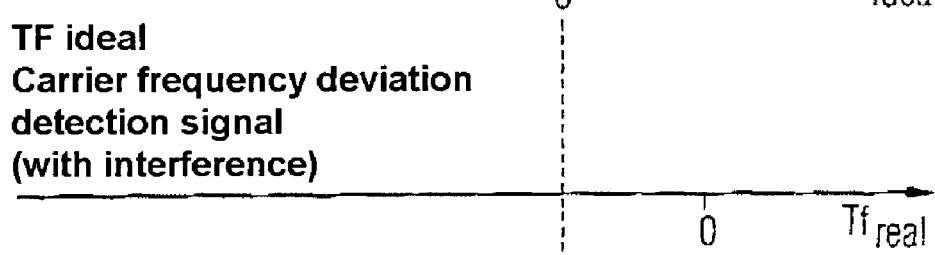
TF ideal
Carrier frequency deviation
detection signal
(with interference)
FIG 3D
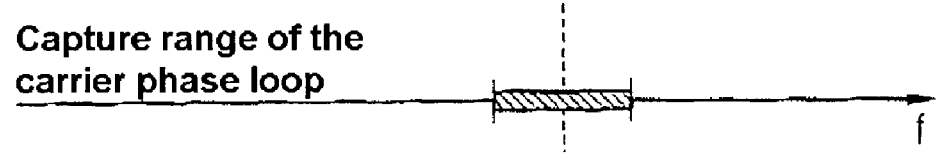
Capture range of the
carrier phase loop 1st embodiment

FIG 5
1st embodiment
FIG 5A
Received signal
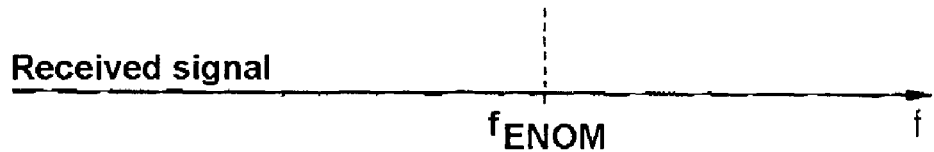
$f_{ENOM}$
FIG 5B
TF ideal
Carrier frequency deviation detection signal
$Tf_{ideal}$
FIG 5C
TF ideal
Carrier frequency deviation detection signal
(with interference)
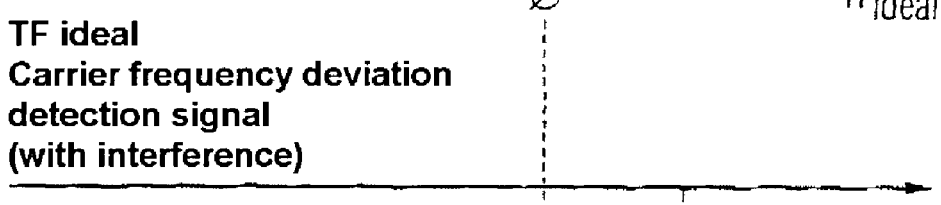
$Tf_{real}$
FIG 5D
Capture range of the carrier phase loop
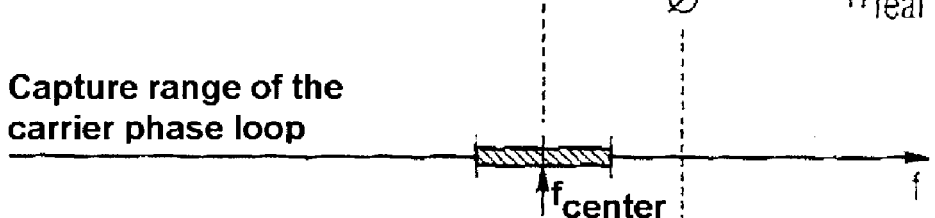
$f_{center}$
FIG 5E
$f_{center}'$

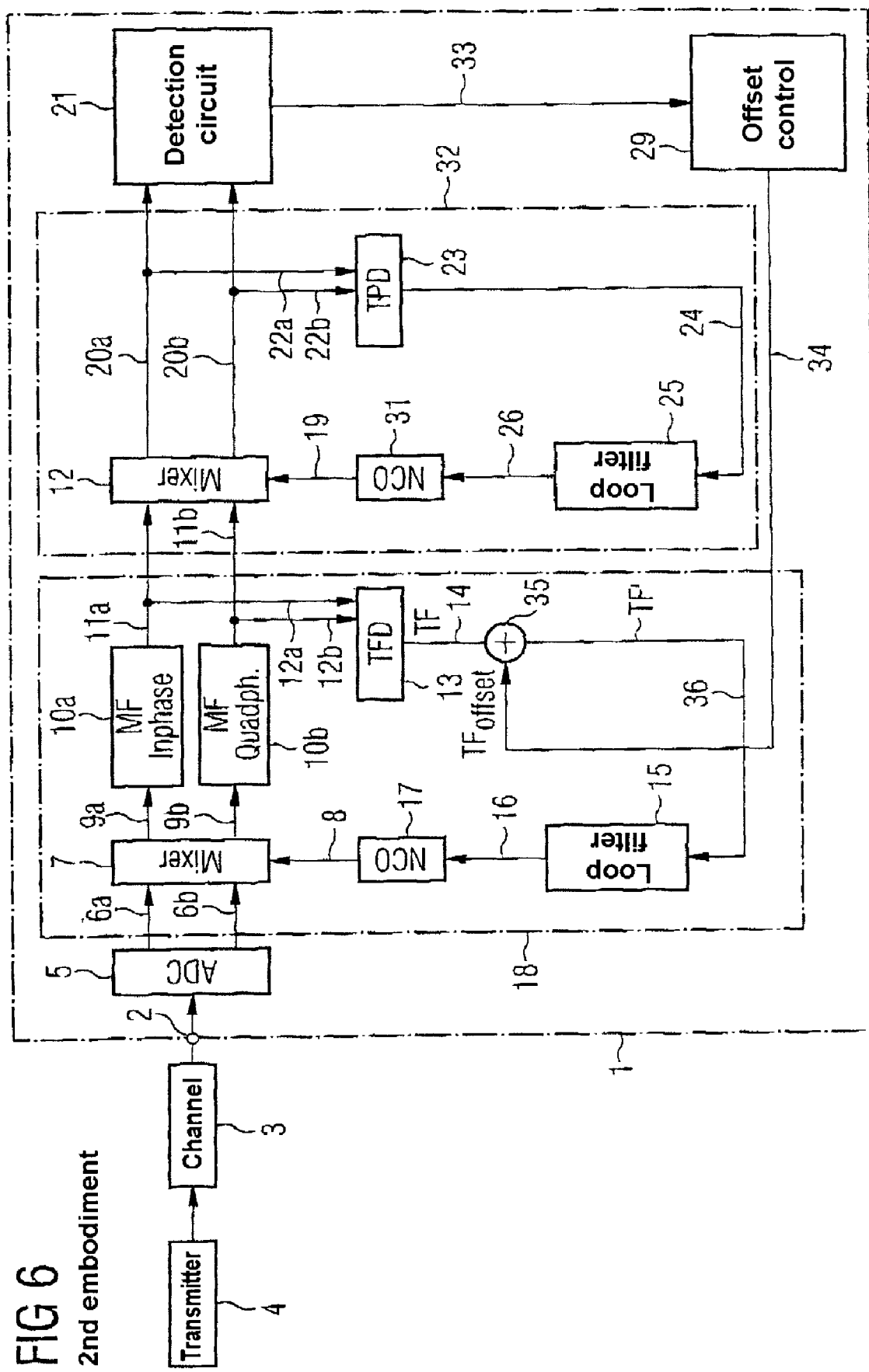

FIG 7
2nd embodiment
FIG 7A
Received signal
FIG 7B  TF ideal
Carrier frequency deviation
detection signal
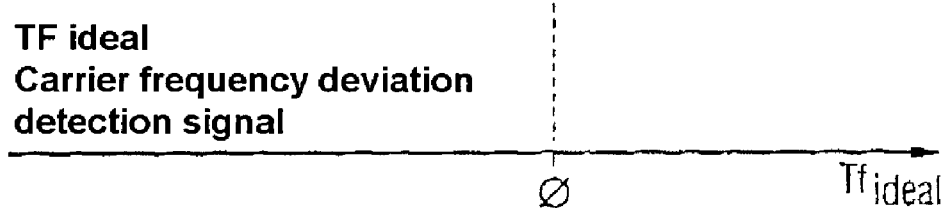
FIG 7C  TF ideal
Carrier frequency deviation
detection signal
(with interference)
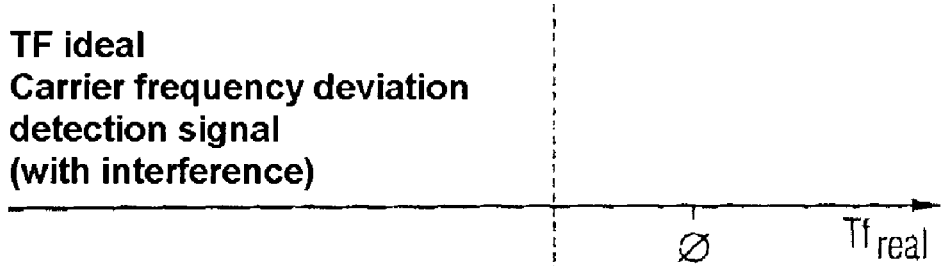
FIG 7D
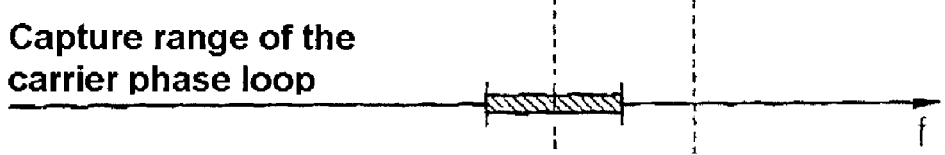
Capture range of the
carrier phase loop
FIG 7E
TF'

RECEIVER WITH OFFSET COMPENSATION

TECHNICAL FIELD

The invention relates to a receiver with offset compensation for receiving a received signal, which contains its [sic] offset control circuit for changing a carrier frequency deviation detection signal and/or a carrier frequency capture range.

BACKGROUND ART

Quadrature amplitude modulation QAM is a digital modulation method which is particularly suitable for transmitting high data rates and combined ASK (Amplitude Shift Keying) and PSK (Phase Shift Keying), i.e. the signal carrier is modulated in amplitude and phase. The amplitude and the frequency or phase of a harmonic oscillation are modulated by two different time functions. In QAM, different variants are possible. In a 64-QAM, 6 bits per data symbol are coded. With increasing level (16-, 64-, 256-, 1 024-QAM) the bandwidth efficiency increases but so does the signal/noise power ratio required for reliable transmission.

FIG. 1 shows a first QAM receiver according to the prior art. The data coming from a data source are transmitted by a transmitter via a transmission channel to the QAM receiver and delivered by this QAM receiver to a downstream data sink. During the data transmission via the real data transmission channel, the received signal, as a rule, exhibits linear distortion and an additional noise component. This noise component can be modeled by additive white Gaussian noise (AWGN). The QAM receiver has the task of reconstructing the bit sequence of the data source from the received signal. For this purpose, the received analog signal is first converted into a digital signal by an analog/digital converter ADC and then delivered to a mixing stage. A downstream receiving filter suppresses possible interference signals outside the transmission frequency band. The reliability of detection is increased by suitably dimensioning a matched filter (MF). The matched filter is specially adapted to a basic transmit pulse so that the greatest possible signal/noise power ratio (SNR) is achieved at the detection times. The impulse response of the matched filter MF is usually equal to the basic transmit pulse mirrored in time or displaced by one bit period. The matched filter is a digital receiving filter inside the receiver which is adapted to a transmit filter inside a transmitter, in such a manner that the amplitude of the received signal is maximum at the sampling times. The matched filter MF can be adaptively designed so that it can be adapted to the transmission channel. An adaptive equalizer which compensates for the distortion of the transmission channel can be provided before or after the matched filter.

The output signal of the matched filter MF is supplied to a carrier phase detector which is provided for detecting the carrier phase of a received digital signal. The carrier phase detector TPD delivers a carrier phase detection deviation signal TP to a downstream digital loop filter. The digital loop filter and the downstream NCO (numerically controlled oscillator) supply a digital control value for the mixing stage.

The QAM receiver according to the prior art, shown in FIG. 1, is constructed in one stage. Frequency and phase estimation are done in one stage. This has the disadvantage that a predetermined frequency range must be scanned for the carrier frequency of the received signal in a great number of small search steps in order to ensure that the target value is located within a narrow frequency capture range. The conventional QAM receiver shown in FIG. 1, therefore, needs a relatively large amount of time for such a search process.

For this reason, the QAM receiver according to the prior art shown in FIG. 2 was proposed. Such a QAM receiver is described in German patent application 101 33 898.8. The QAM receiver according to the prior art, shown in FIG. 2, is constructed in two stages. The QAM receiver contains a carrier frequency loop for detecting a carrier frequency of the received signal in a first carrier frequency capture range followed by a carrier phase loop for detecting a carrier phase of the received signal in a second carrier frequency capture range. Compared with the single-stage QAM receiver shown in FIG. 1, separating the frequency and phase estimation has the advantage that the frequency estimation by the carrier frequency loop has a large carrier frequency capture range.

The carrier frequency loop of the conventional QAM receiver shown in FIG. 2 has a carrier frequency detector which follows the two matched filters MF. The carrier frequency detector generates a carrier frequency deviation detection signal TF which is supplied to a numerically controlled oscillator NCO via a digital loop filter. The NCO delivers a control signal to the mixing stage.

The downstream carrier phase loop is constructed in a similar manner and contains a carrier phase detector TPD which generates a carrier phase deviation detection signal TP. The carrier phase deviation detection signal TP is also supplied to a loop filter which digitally filters the carrier phase deviation detection signal TP and delivers it to a downstream controlled oscillator NCO. The NCO forms a control signal which is supplied to a further mixing stage.

FIG. 3 is a diagram for explaining the operation of the conventional QAM receiver shown in FIG. 2. If the carrier frequency of the received signal is at a nominal frequency $f_{ENOM}$, the carrier frequency loop generates a carrier frequency deviation detection signal $TF_{IDEAL}$ having the value zero. However, due to interference, the carrier frequency loop generates a real carrier frequency deviation detection signal $TF_{REAL}$ which has an offset as shown in FIG. 3c. The frequency error after the frequency estimation can have various causes, namely intrinsic noise of the frequency detector, amplitude phase errors in the transmission channel or, for example, a wrongly dimensioned anti-aliasing filter. In all these cases, the characteristic of the frequency detector, which forms an S curve, is distorted in such a manner that the detector output signal does not provide a frequency offset even though there is a frequency offset present. A resultant controlled variable thus has the value zero for a frequency value which deviates from the ideal frequency estimate ($F_{ENOM}$). The real carrier frequency deviation detection signal $TF_{REAL}$ thus has a frequency offset.

If the deviation or the error of the frequency estimation by the carrier phase loop is too great, the subsequent phase estimation of the carrier phase of the received signal by the carrier phase loop can no longer compensate for the remaining frequency error. If, as shown in the example of FIG. 3, the zero value of the real carrier frequency deviation detection signal is located outside the carrier frequency capture range, shown in FIG. 3d, of the carrier phase loop, the carrier phase loop can no longer compensate for this considerable frequency error and the conventional QAM receiver shown in FIG. 2 cannot receive a received signal. The carrier frequency capture range of the carrier phase loop depends on the signal/noise ratio SNR of the complete transmission system and can only be extended within narrow limits.

SUMMARY OF THE INVENTION

It is, therefore, the object of the present invention to create a receiver for receiving a received signal which rapidly determines the carrier frequency and operates reliably even with large frequency errors.

According to the invention, this object is achieved by a receiver having the features specified in claim 1.

Preferred embodiments of the receiver according to the invention are specified in the subclaims.

The invention creates a receiver for receiving a received signal with a carrier frequency loop which generates a carrier frequency deviation detection signal TF for detecting a carrier frequency of the received signal in a first carrier frequency capture range, a carrier phase loop which generates a carrier phase deviation detection signal TP for detecting a carrier phase of the received signal, and settles when the carrier frequency deviation detection signal TF is within a second carrier frequency capture range, and with an offset control circuit which changes the carrier frequency deviation detection signal TF and/or the second carrier frequency capture range by means of an offset control signal until a carrier phase lock detection circuit of the offset control circuit indicates that the carrier phase offset of the received signal is less than an adjustable threshold value.

In a preferred embodiment of the QAM receiver according to the invention, the second carrier frequency capture range is narrower than the first carrier frequency capture range.

The receiver according to the invention is preferably a QAM receiver.

The carrier frequency loop of the QAM receiver according to the invention preferably has a carrier frequency detector, a first digital loop filter, a first controlled oscillator and a first mixing stage.

The carrier phase loop of the QAM receiver according to the invention preferably has a carrier phase detector, a second digital loop filter, a second controlled oscillator and a second mixing stage.

In a preferred embodiment of the receiver according to the invention, a first matched filter for the in-phase signal component of the received QAM signal and a second matched filter for the quadrature signal component of the received QAM signal are provided between the first mixing stage of the carrier frequency loop and the second mixing stage of the carrier phase loop.

The second mixing stage of the QAM receiver according to the invention is preferably followed by a carrier phase lock detection circuit.

In a particularly preferred embodiment of the receiver according to the invention, the offset control circuit generates a carrier phase offset signal which is added to the carrier phase deviation detection signal TP, filtered by the second digital loop filter of the carrier phase loop, by an adder for shifting the frequency of the carrier frequency capture range of the carrier phase loop.

In an alternative embodiment of the receiver according to the invention, the offset control circuit generates a carrier frequency offset signal which is added to the carrier frequency deviation detection signal TF, generated by the carrier frequency detector, by an adder for compensating for a frequency offset of the received signal.

BRIEF DESCRIPTION OF THE DRAWINGS

In the text which follows, preferred embodiments of the receiver according to the invention are described for explaining features essential to the invention, referring to the figures, in which:

FIG. 3 shows a diagram for explaining the disadvantages of the QAM receiver according to the prior art, shown in FIG. 2;

FIG. 5 shows diagrams for explaining the operation of the first embodiment of the receiver according to the invention, shown in FIG. 4;

FIG. 6 shows a second embodiment of the receiver according to the invention;

FIG. 7 shows diagrams for explaining the operation of the second embodiment of the receiver according to the invention.

DETAILED DESCRIPTION OF THE INVENTION

Figure 1:
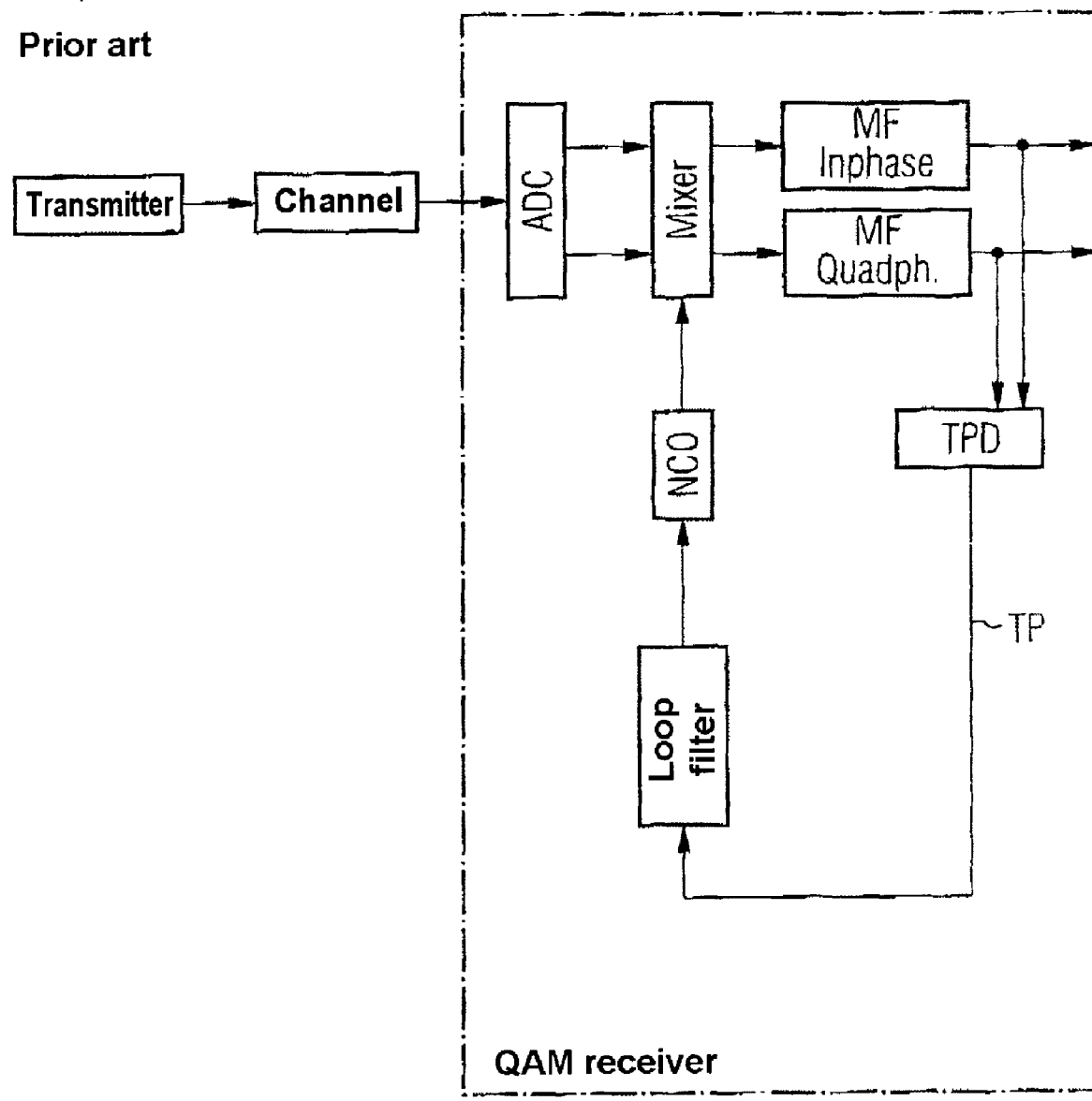
FIG. 1 shows a QAM receiver according to the prior art.
Figure 2:
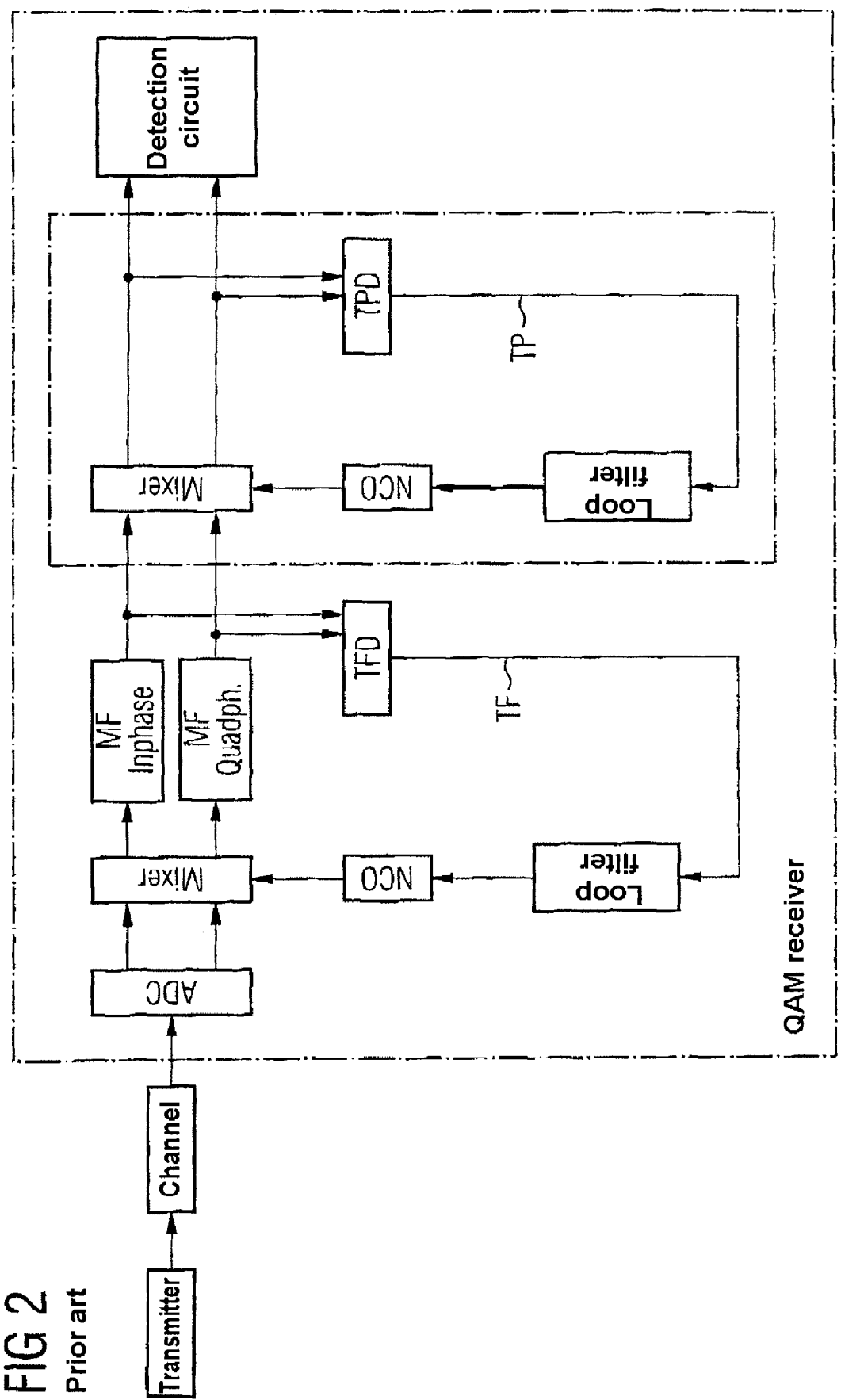
FIG. 2 shows a further QAM receiver according to the prior art.
Figure 4:
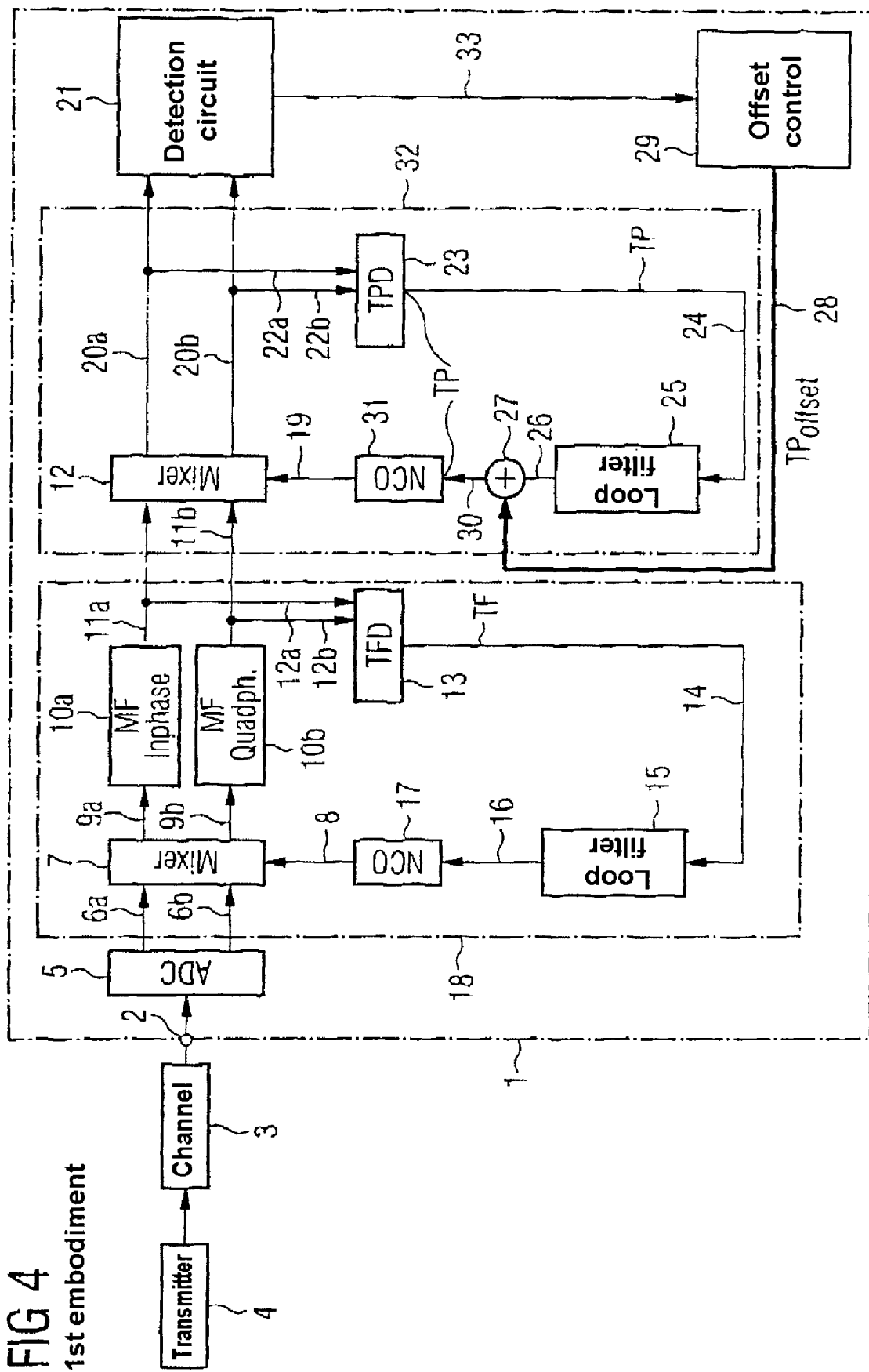
FIG. 4 shows a first embodiment of the receiver according to the invention.

FIG. 4 shows a first embodiment of the receiver 1 according to the invention for receiving a received signal. The receiver 1 receives via a signal input 2 a received signal which is transmitted by a transmitter 4 by a transmission channel 3. The received analog signal is converted into a digital signal by an analog/digital converter 5 and supplied as in-phase signal component to a first mixing stage 7 via a line 6a and as quadrature signal component via a line 6b. The mixing stage 7 multiplies the in-phase signal component and the quadrature signal component in the time domain with a control signal present on a line 8. The mixed in-phase signal component is supplied to an in-phase matched filter 10a via a line 9a. The mixed quadrature signal component is delivered to a quadrature phase matched filter 10b via a line 9b. The in-phase matched filter is connected via a line 11a, and the quadrature phase matched filter 10b is connected via a line 11b, to a downstream further mixing stage 12. In addition, the output signal of the in-phase matched filter 10a is applied via a line 13a, and the output signal of the quadrature phase matched filter 10b is applied via a line 12b, to a carrier frequency detector 13. The carrier frequency detector 13 generates a carrier frequency deviation detection signal TF and delivers it via a feedback line 14 to a digital loop filter 15. The digital loop filter 15 filters the carrier frequency deviation detection signal TF present and applies the filtered signal to a downstream first controlled oscillator 17 via a line 16. The numerically controlled oscillator 17 generates the control signal for the first mixing stage 7 in dependence on the filtered carrier frequency deviation detection signal TF. The first mixing stage 7, together with the matched filters 10a, 10b, the carrier frequency detector 13, the digital loop filter 15 and the controlled oscillator 17, forms a carrier frequency loop 18 of the receiver 1 for detecting the carrier frequency of the received signal in a first carrier frequency capture range.

The output signals of the two matched filters 10a, 10b, delivered via the lines 11a, 11b, are supplied to the second mixing stage 12. The second mixing stage 12 multiplies the output signals present from the two matched filters 10a, 10b in the time domain with a control signal present on a line 19. The mixed signals are supplied to a carrier phase lock detection circuit 21 via lines 20a, 20b. In addition, the output signals of the second mixing stage 12 are applied to a carrier phase detector 23 via lines 22a, 22b. The carrier phase detector 23 generates a carrier phase deviation detection signal TP which is applied to a digital loop filter 25 via a feedback line 24. The digital loop filter 25 filters the carrier phase deviation detection signal TP applied and delivers it to an adder 27 via a line 26. The adder 27 adds the filtered carrier phase deviation detection signal TP to a carrier phase offset signal TP offset which is delivered by an offset control circuit 29 of the receiver 10 [sic] according to the invention via an offset control line 28. The aggregate signal produced by the addition is delivered by the adder 27 via a line 30 to a downstream controlled oscillator 31 which generates the control signal for the second mixing stage 12. The second mixing stage 12, together with the carrier phase detector 23, the second digital loop filter 25 and the second controlled oscillator 31, forms a carrier phase loop 32 of the receiver 1 according to the invention.

The carrier phase lock detection circuit following the carrier phase loop 32 indicates to the offset control circuit 29 via a line 33 whether the carrier phase offset of the received signal is less than an adjustable threshold value. This tells the offset control 29 that the carrier frequency of the received signal has been determined with sufficient accuracy.

FIG. 5 shows the operation of the first embodiment of the QAM receiver 1 according to the invention as shown in FIG. 4. The offset control circuit 29 generates a carrier phase offset signal TP Offset which is added to the carrier frequency deviation detection signal TP, filtered by the digital loop filter 25, by the adder 27 for shifting the frequency of the carrier frequency capture range of the carrier phase loop 32. As a result, the carrier frequency capture range of the carrier phase loop is shifted from the position shown in FIG. 5d into the position shown in FIG. 5e. The center frequency of the carrier frequency capture range is shifted. The offset control 29 shifts the carrier frequency capture range of the carrier phase loop 32 until the carrier phase lock detection circuit 21 indicates that the zero value of the carrier frequency deviation detection signal $TF_{REAL}$ lies within the shifted carrier frequency capture range of the carrier frequency loop 32.

The carrier frequency capture range of the carrier phase loop 32 can be changed by the offset control circuit 29 in accordance with various search strategies. The carrier frequency capture ranges can be scanned either linearly in succession beginning at a lower center frequency up to an upper center frequency by the offset control circuit 29 or the offset control circuit begins in a centrally positioned carrier frequency capture range and varies the carrier frequency capture ranges around this centrally positioned carrier frequency capture range. In a preferred embodiment of the receiver, the shifted carrier frequency capture ranges overlap to some extent.

FIG. 6 shows a further embodiment of the receiver 1 according to the invention. In this embodiment components contained identically in the first embodiment are provided with the same reference symbols.

The QAM receiver 1 shown in FIG. 6 also contains a carrier frequency loop 18 and a carrier phase loop 32. In the second embodiment shown in FIG. 6, the offset control circuit 29 generates a carrier frequency offset control signal $TF_{OFFSET}$ which is applied to an adder 35 within the carrier frequency loop 18 via a line 34. At its other input, the adder 35 receives the carrier frequency deviation detection signal TF generated by the carrier frequency detector 13 and adds it to the carrier frequency offset control signal $TF_{OFFSET}$ delivered by the offset control circuit 29 via the line 24 to form an offset-compensated carrier frequency deviation detection signal TF' which is supplied to the digital loop filter 15 via a line 36.

FIG. 7 shows the operation of the second embodiment of the receiver 1 according to the invention, shown in FIG. 6. The zero value of the real carrier frequency deviation detection signal as shown in FIG. 7c is shifted by the offset signal $TF_{OFFSET}$ generated by the offset control circuit 29. The offset control circuit 29 changes the carrier frequency deviation detection signal by means of the offset signal until the carrier frequency deviation detection signal TF' is located within the carrier frequency capture range of the carrier phase loop 32 as shown in FIG. 7d. This is indicated to the offset control circuit 29 by the carrier phase lock detection circuit 29. The carrier frequency deviation detection signal $TF_{REAL}$ can be changed by the offset control circuit 29 in accordance with various search strategies. The zero value is changed, for example, linearly from a lower limit frequency to an upper limit frequency until it falls within the carrier frequency capture range of the carrier phase loop. Other search strategies with alternate searching around a predetermined starting value are also possible.

What is claimed is:

1. Receiver for receiving a received signal with:
   a) a carrier frequency loop which generates a carrier frequency deviation detection signal for detecting a carrier frequency of the received signal in a first carrier frequency capture range;
   b) a carrier phase loop which generates a carrier phase deviation detection signal for detecting a carrier phase of the received signal in a second carrier frequency capture range, and with
   c) an offset control circuit which changes the carrier frequency deviation detection signal and/or changes the second carrier frequency capture range by means of an offset control signal until a carrier phase lock detection circuit indicates to the offset control circuit that a carrier phase offset of the received signal is less than an adjustable threshold value.

2. Receiver according to claim 1, wherein the second carrier frequency capture range is narrower than the first carrier frequency capture range.

3. Receiver according to claim 1, wherein the receiver is a QAM receiver.

4. Receiver according to claim 1, wherein the carrier frequency loop has a carrier frequency detector, a first digital loop filter, a first controlled oscillator and a first mixing stage.

5. Receiver according to claim 1, wherein the carrier phase loop has a carrier phase detector, a second digital loop filter, a second controlled oscillator and a second mixing stage.

6. Receiver according to claim 1, wherein a first matched filter for the in-phase signal component of a received QAM signal and a second matched filter for the quadrature signal component of the received QAM signal are provided between a first mixing stage of the carrier frequency loop and a second mixing stage of the carrier phase loop.

7. Receiver according to claim 6, wherein the second mixing stage is followed by the carrier phase lock detection circuit.

8. Receiver according to claim 5, wherein the offset control circuit generates a carrier phase offset signal which is added to the carrier phase deviation detection signal, filtered by the second digital loop filter of the carrier phase loop, by an adder for shifting the frequency of the second carrier frequency capture range of the carrier phase loop.

9. Receiver according to claim 1, wherein the offset control circuit generates a carrier frequency offset signal which is added to the carrier frequency deviation detection signal, generated by the carrier frequency loop, by an adder for compensating for a frequency offset of the received signal.

* * * * *